(12) United States Patent
Lee et al.

(10) Patent No.: US 11,388,350 B2
(45) Date of Patent: Jul. 12, 2022

(54) AUTONOMOUS GLARE REMOVAL TECHNIQUE

(71) Applicant: THE REGENTS OF THE UNIVERSITY OF MICHIGAN, Ann Arbor, MI (US)

(72) Inventors: Somin Eunice Lee, Ann Arbor, MI (US); Yunbo Liu, Ann Arbor, MI (US); Young Geun Park, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 29 days.

(21) Appl. No.: 17/133,600

(22) Filed: Dec. 23, 2020

(65) Prior Publication Data

US 2021/0203824 A1    Jul. 1, 2021

Related U.S. Application Data

(60) Provisional application No. 62/954,208, filed on Dec. 27, 2019.

(51) Int. Cl.
*H04N 5/238* (2006.01)
*H04N 5/225* (2006.01)

(52) U.S. Cl.
CPC .......... *H04N 5/238* (2013.01); *H04N 5/2254* (2013.01)

(58) Field of Classification Search
CPC .............................. H04N 5/2254; H04N 5/238
USPC ......................................................... 348/148
See application file for complete search history.

(56) References Cited

U.S. PATENT DOCUMENTS

| | | |
|---|---|---|
| 4,232,948 A | 11/1980 | Shanks |
| 5,347,382 A | 9/1994 | Rumbaugh |
| 2004/0085499 A1 | 5/2004 | Baek |

*Primary Examiner* — On S Mung
(74) *Attorney, Agent, or Firm* — Harness, Dickey & Pierce, P.L.C.

(57) ABSTRACT

A method is presented for reducing glare in images captured by an imaging system. As a starting point, multiple images of a scene are captured by an imaging system to form a set of images, where the imaging system includes a voltage tunable polarizer and each image in the set of images is captured with the voltage tunable polarizer set at a different polarization angle. The method further includes: partitioning each image in the set of images into a plurality of segments; for corresponding segments in the set of images, determining an amount of change in intensity across corresponding segments of images; quantifying the amount of intensity change for each image in the set of images; and identifying a given image from the set of images based on the quantified amount of intensity change, where the given image has least amount of intensity change amongst the set of images.

15 Claims, 5 Drawing Sheets

AUTONOMOUS GLARE REMOVAL TECHNIQUE

CROSS-REFERENCE TO RELATED APPLICATIONS

This application claims the benefit of U.S. Provisional Application No. 62/954,208, filed on Dec. 27, 2019. The entire disclosure of the above application is incorporated herein by reference.

FIELD

The present disclosure relates to techniques for reducing glare in images captured by an imaging system through the use of an autonomous voltage tunable polarizer.

BACKGROUND

Perception technologies are the "eyes" of autonomous vehicles (water, land, space) which enable accurate navigation in dynamic environments. Poor visibility due to glare, fog, haze and turbidity can severely impact navigation capabilities. To reduce glare, computational methods are typically applied to post-process an image containing glare. However, computational methods alone can perform poorly when the signal-to-noise ratio is low, such as in the case of strong glare which necessitates physical methods of removal. Physical methods have previously utilized fixed optical elements for glare reduction, such as anti-glare lens coatings or fixed linear polarizers. However, in the case of dynamic objects, as the angle of incidence and the wavelength of light varies under dynamic conditions, new adaptive correction methods are needed. To address these needs, an imaging system is presented with an autonomous voltage tunable polarizer capable of sensing its polarized environment, correcting poor visibility, and operating without human input.

This section provides background information related to the present disclosure which is not necessarily prior art.

SUMMARY

This section provides a general summary of the disclosure, and is not a comprehensive disclosure of its full scope or all of its features.

In one aspect, a method is presented for reducing glare in images captured by an imaging system. As a starting point, multiple images of a scene are captured by an imaging system to form a set of images, where the imaging system includes a voltage tunable polarizer and each image in the set of images is captured with the voltage tunable polarizer set at a different polarization angle. The method further includes: partitioning each image in the set of images into a plurality of segments; for corresponding segments in the set of images, determining an amount of change in intensity across corresponding segments of images in the set of images; quantifying the amount of intensity change for each image in the set of images; and identifying a given image from the set of images based on the quantified amount of intensity change, where the given image has least amount of intensity change amongst the set of images.

In another aspect, the captured images are processed as follows: partitioning each image in the set of images into a plurality of segments; for corresponding segments in the set of images, determining an amount of change in intensity across corresponding segments of images in the set of images; identifying a particular segment from the plurality of segments which exhibits glare; identifying a particular image from the set of images, where the particular image includes the particular segment with lowest average intensity for pixels comprising the particular segment; determining a polarization angle at which the particular image was captured; and capturing additional images of a scene with the imaging system, where the additional images are captured at polarization angles centered around the polarization angle at which the particular image was captured and separation between the polarization angles is less than the separation at which the multiple images were captured.

In one embodiment, the additional images are further processed. Specifically, each image in the additional images is partitioned into the plurality of segments. For the particular segment in each additional image, an amount of change in intensity across pixels comprising the particular segment is determined and a particular segment is selected from the additional images, where the selected particular segment has lowest amount of change in intensity across pixels comprising the selected particular segment. A final image can be constructed in part using the selected particular segment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
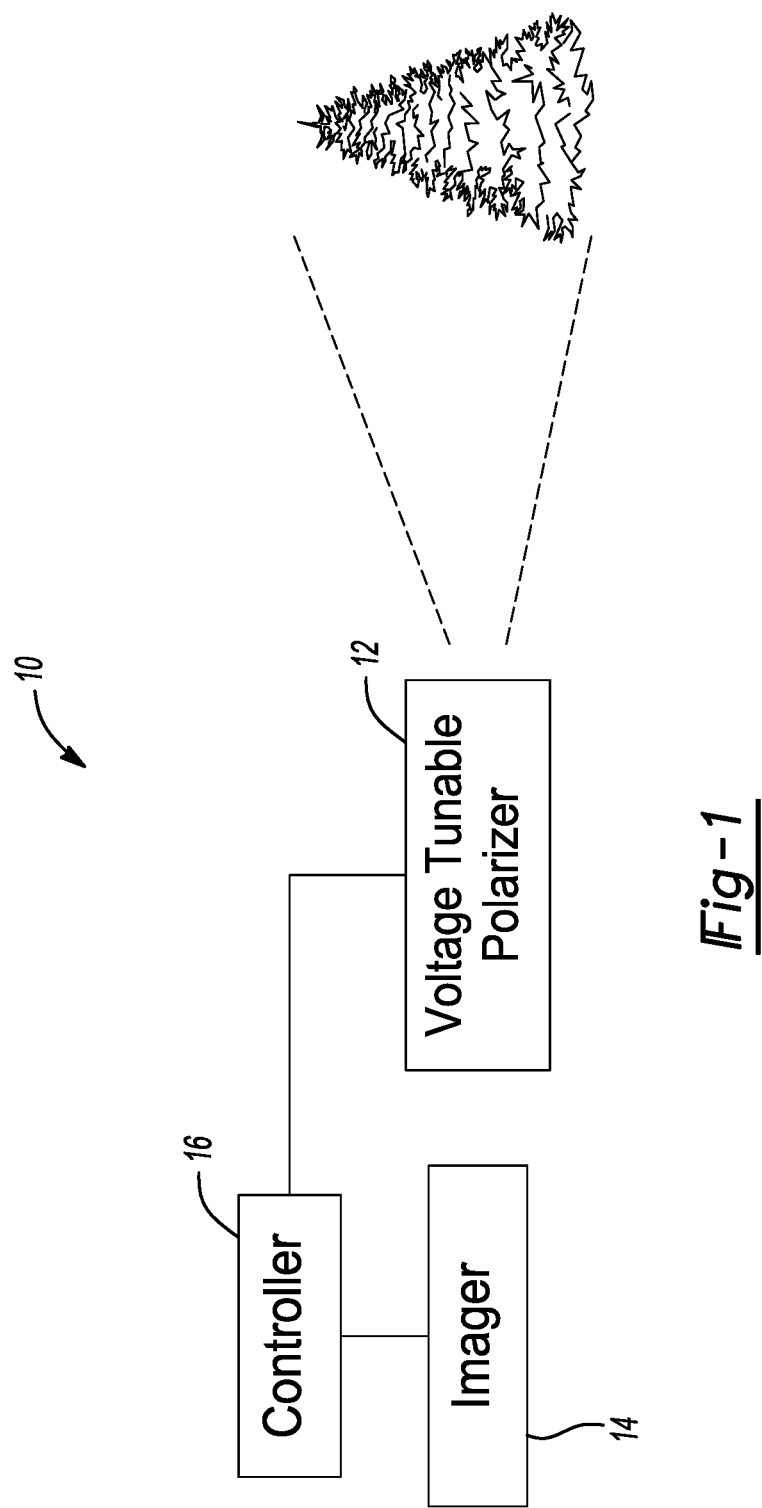
FIG. 1 is a diagram depicting an example imaging system equipped with an autonomous voltage tunable polarizer.

FIG. 1 depicts an example imaging system 10 equipped with a voltage tunable polarizer 12. The voltage-tunable polarizer 12 is disposed in the incoming light path of an imager 14. In one embodiment, the imager is a camera or the like. In other embodiments, the imager may be an optical microscope. It is understood that the imaging system 10 may include additional optical components (e.g., lens) for directing the light along a light path to the imager 14.

A controller 16 is operably coupled to the voltage-tunable polarizer 12 and supplies voltage to the voltage-tunable polarizer 12. In response to a voltage applied thereto, the voltage-tunable polarizer 12 changes polarization state of light propagating through the polarizer without mechanical rotation of the polarizer itself. In a simple form, the voltage-tunable polarizer 12 is implemented by a pair of liquid crystal variable retarders aligned in series in the light path of the imager 14.

In one embodiment, the controller 16 is implemented as a microcontroller. It should be understood that the logic for the controller 16 can be implemented in hardware logic, software logic, or a combination of hardware and software logic. In this regard, controller 16 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller 16 performs a function or is configured to perform a function, it should be understood that controller 16 is configured to do so with appropriate logic (such as in software, logic devices, or a combination thereof).

Figure 2:
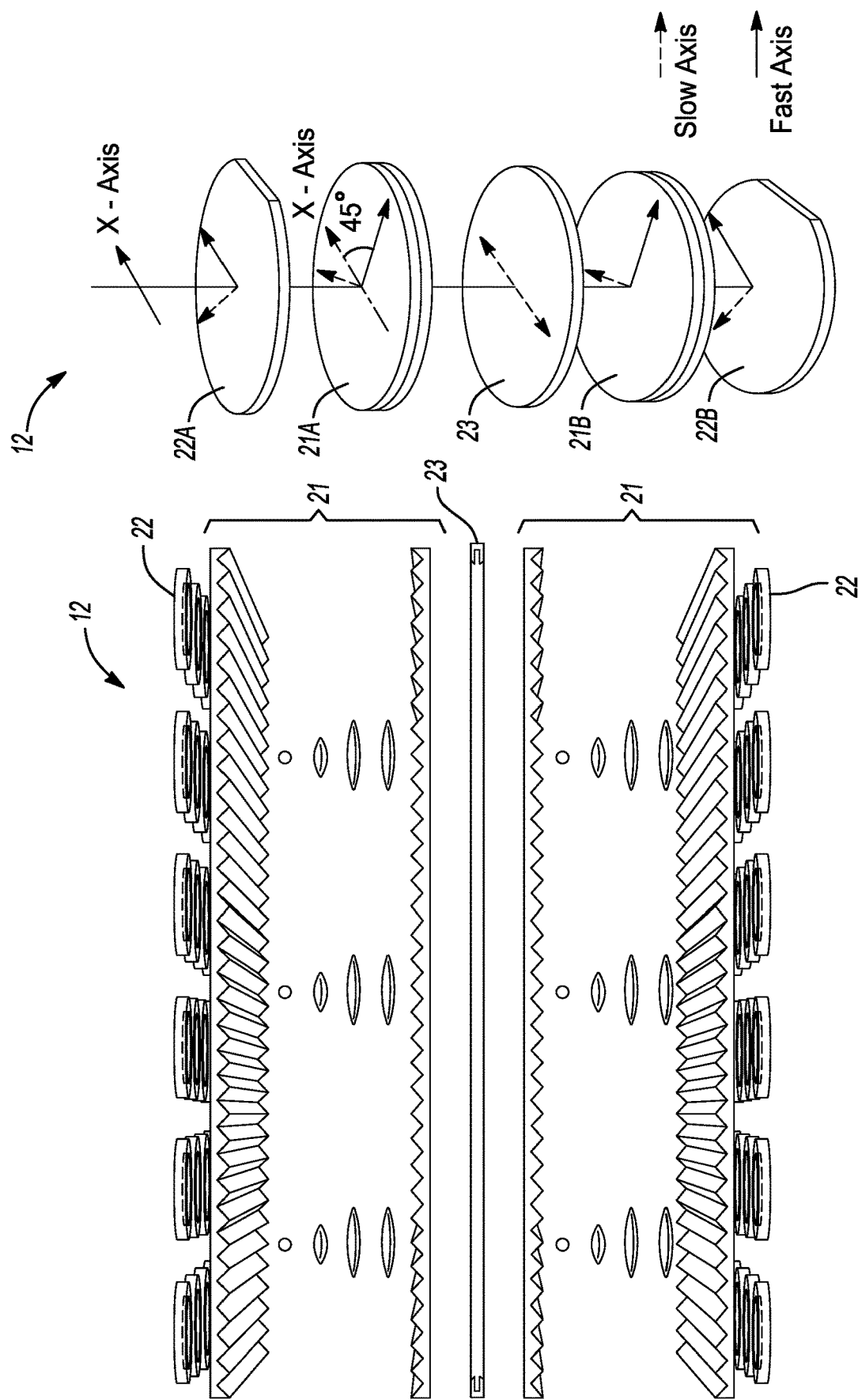
FIG. 2A is a cross-sectional exploded view of a first example embodiment of a voltage-tunable polarizer.
FIG. 2B is a perspective exploded view of the first example embodiment of the voltage-tunable polarizer.

FIGS. 2A and 2B depict a first example embodiment of the voltage-tunable polarizer 12. In this example, the voltage-tunable polarizer 12 has a compact sandwich structure, consisting of two variable liquid crystal retarders 21, two λ/4 achromatic polymer retarder films 22 (i.e., quarter waveplate) and a high-contrast linear polarizing film 23. More specifically, a first quarter waveplate 22A is configured to receive the light from the optical microscope. A first liquid crystal retarder 21A is positioned adjacent to the first quarter waveplate 22A and configured to receive the light passing through the first quarter waveplate 22A. The linear polarizer 23 has an incoming surface and an outgoing surface. The incoming surface of the linear polarizer 23 is adjacent to the first liquid crystal retarder 21A and thus receives the light passing through the first liquid crystal retarder 21A. The outgoing surface of the linear polarizer 23 is adjacent to a second liquid crystal retarder 21B. The second liquid crystal retarder 21B receives the light passing through the linear polarizer 23. Lastly, a second quarter waveplate 22B is positioned adjacent to the second liquid crystal retarder 21B and is configured to receive the light passing through the second liquid crystal retarder 21B.

The transmission axis of the linear polarizing film 23 and the fast axis of the polymer retarder films 22 are both parallel with respect to the x-axis, while the fast axis of the liquid crystal retarders 21 are aligned at forty-five or odd multiples of forty-five degrees with the x-axis as seen in FIG. 2B. That is, the transmission axis of the linear polarizer 23 is parallel with the fast axis of the first quarter waveplate 22A and the fast axis of the second quarter waveplate 22B. The fast axis of the first liquid crystal retarder 21A resides in a plane that is parallel with the transmission axis of the linear polarizer 23 but is aligned at forty-five or odd multiples of forty-five degrees from the transmission axis of the linear polarizer 23. Likewise, the fast axis of the second liquid crystal retarder 21B resides in a plane that is parallel with the transmission axis of the linear polarizer 23 but is aligned at forty-five degrees from the transmission axis of the linear polarizer 23.

By applying amplitude-modulated voltage on the liquid crystal retarders 21A, 21B, the polarization transmission axis of the optically active polarizer 33 can be rotated ranging from 0 degree to 180 degree with response time up to 50 ms.

Figure 3:
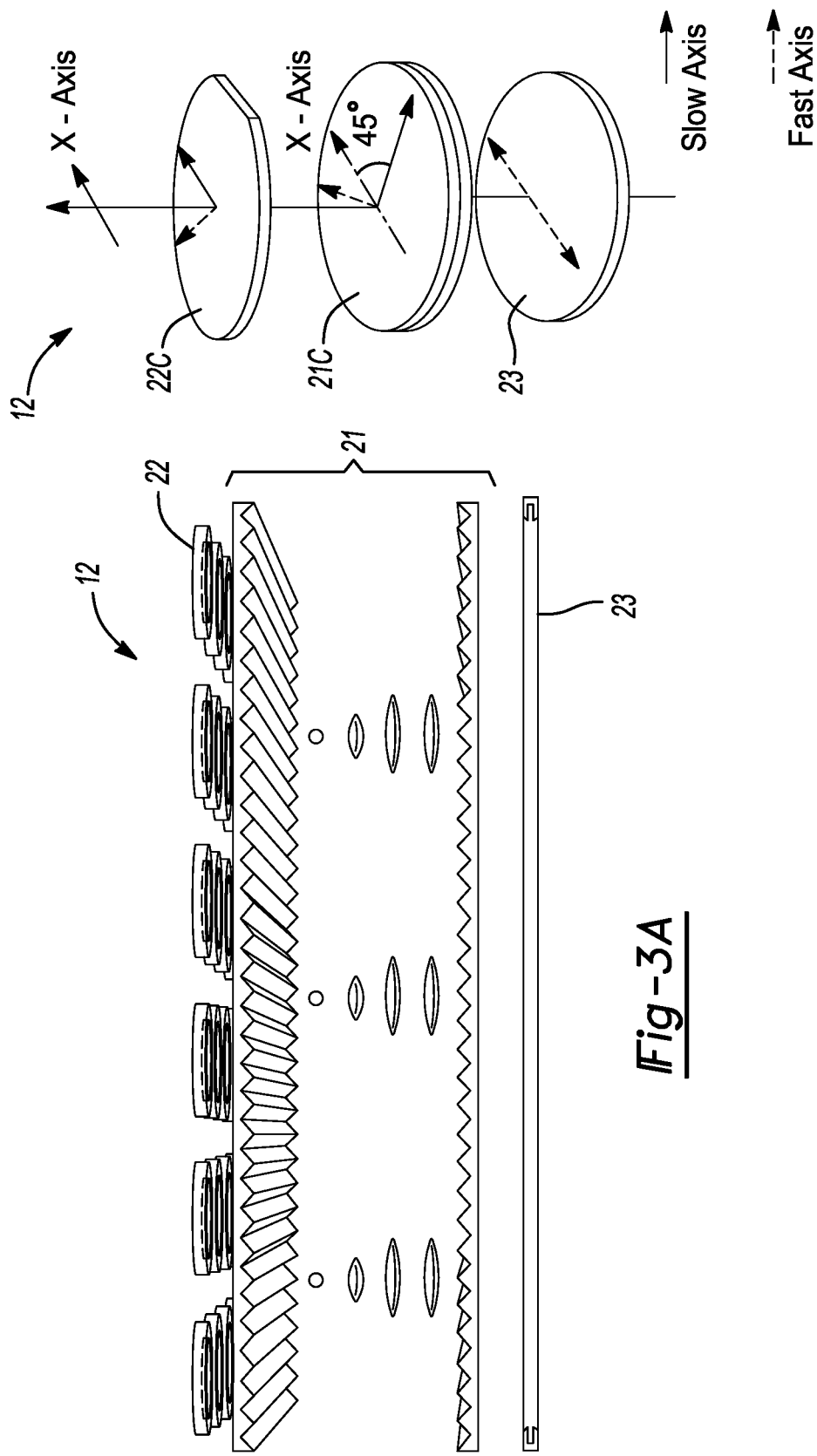
FIG. 3A is a cross-sectional exploded view of a second example embodiment of a voltage-tunable polarizer.
FIG. 3B is a perspective exploded view of the second example embodiment of the voltage-tunable polarizer.

FIGS. 3A and 3B depict another example embodiment of the voltage-tunable polarizer 12 functioning as an intensity modulator. In this example, the polarizer 12 includes three optical elements: a quarter wave plate 22C, a liquid crystal retarder 21C and a thin film linear polarizer 23. The quarter wave plate 22C is configured to receive the light incident upon an exposed surface thereof. The liquid crystal retarder 21C is positioned adjacent to the quarter wave plate 22C and is configured to receive the light passing through the quarter wave plate. The linear polarizer 23 is positioned adjacent to the liquid crystal retarder 21C and is configured to receive the light passing through the liquid crystal retarder 21C. More specifically, the transmission axis of the linear polarizer 23 is parallel with the fast axis of the quarter waveplate 22C, and the fast axis of the liquid crystal retarder 21C resides in a plane that is parallel with the transmission axis of the linear polarizer 23 but is aligned at forty-five or odd multiples of forty-five degrees from the transmission axis of the linear polarizer 23. Thus, this design minimizes the number of optical elements required while providing high transmission combined with low-cost and compact footprint. It is particularly suitable for use in imaging systems such as a microscope and CCD camera. It is also suitable for precision polarimetric imaging of anisotropic nano/micro structures with high spatial precision and fast response time.

Both embodiments of the voltage-tunable polarizer 12 can be operated over a relatively broad wavelengths (~a 60-nm bandwidth) with high extinction ratio (~up to 300), and uniform transmission (~55%) over a large input power range (<5% deviation for input power from 50 µW to ~20 mW). In addition, the voltage-tunable polarizer 12 is also compatible with circular and elliptical polarization modulation, offering a versatile platform for imaging the anisotropic nano/micro structures. Further details regarding these example embodiments of the voltage-tunable polarizer can be found in U.S. patent application Ser. No. 16/761,826 filed on May 6, 2020 which is entitled "Voltage-Tunable Polarizer" and is incorporated in its entirety by reference. While reference is made to two particular embodiments, it is readily understood that other implementations for a voltage tunable polarizer fall within the broader aspects of this disclosure.

Figure 4:
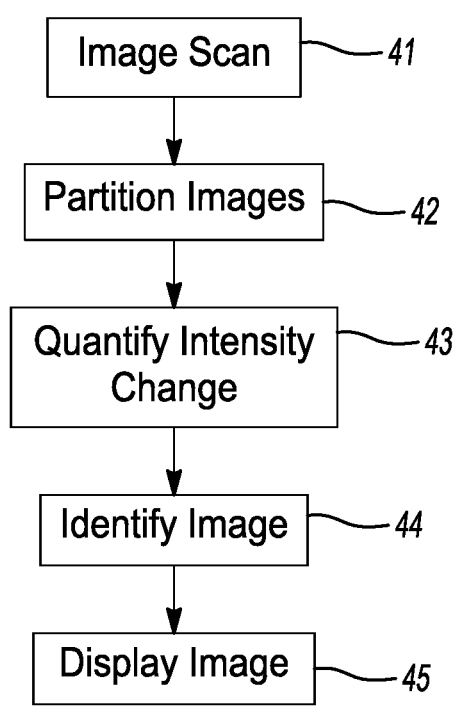
FIG. 4 is a flowchart depicting a technique for improving visibility of images captured by the imaging system using the voltage tunable polarizer.

FIG. 4 presents a technique for improving visibility of images captured by the imaging system 10 using a voltage tunable polarizer 12. As a starting point, the imaging system captures multiple images of a scene at 41 to form a set of images. Of note, each image in the set of images is captured with a different polarization angle. The controller interacts with the voltage tunable polarizer to change the polarization angle at which a given image is captured. In one example, seven different images are captured corresponding to polarization angles ranging from 0 to 180 degrees. That is, images are captured with the polarization angle of the voltage tunable polarizer set at 0, 30, 60, 90, 120, 150 and 180 degrees. The set of images is then processed by a signal processor, for example integrated into the controller 16.

During processing, each image in the set of images is partitioned at 42 into a plurality of segments. Segments include data from three or more pixels from the image captured by the imager 14. For example, each image is partitioned into N by N segments, where each segment is 50×50 pixels with a total of $N^2$ segments for each image.

Sizing of the segments can vary depending upon the application and the precision required.

Next, quantifiable image parameters, such as intensity, contrast, phase, etc., are used to identify key areas of the image. In one example, changes in intensity across corresponding segments of the images in the set of images is quantified at 43. More specifically, an average intensity for a given segment is first computed from the pixels associated with the given segment. The change in intensity for the given segment can then be represented by a ratio, where the numerator is the difference between the average intensity value from the segment with the highest average value amongst corresponding segments and the average intensity value from the segment with the lowest average value amongst corresponding segments. The denominator is the average intensity value from the segment with the highest average value. Segments with a higher ratio of intensity change across segments in the set of images is an indication of significant glare or other impediments to the visibility of the image (e.g., fog, sleet, snow, etc.). Conversely, segments with a smaller ratio of intensity change across segments in the set of images is an indication of better visibility. Other metrics for quantifying the change in intensity across corresponding segments in the set of images are also contemplated by this disclosure.

Based on the quantified change in intensity across corresponding segments of the images in the set of images, an image (or parts of images) having the best visibility are identified at 44. In one simple example, the image having the least amount of intensity change amongst the set of images is identified. This image is deemed to have the least amount of glare or other visibility impediments. In more robust examples, segments may be selected from different images in the set of images and stitched together to form a final image as will be further described below. The final image (either identified or constructed) is then suitable for use in different applications. In one application, the final image is displayed at 45 in real time on a display device of the imaging system. In another application, the final image is input into a control system for an autonomous vehicle, such that the autonomous vehicle is controlled in part based on the final image.

Figure 5:
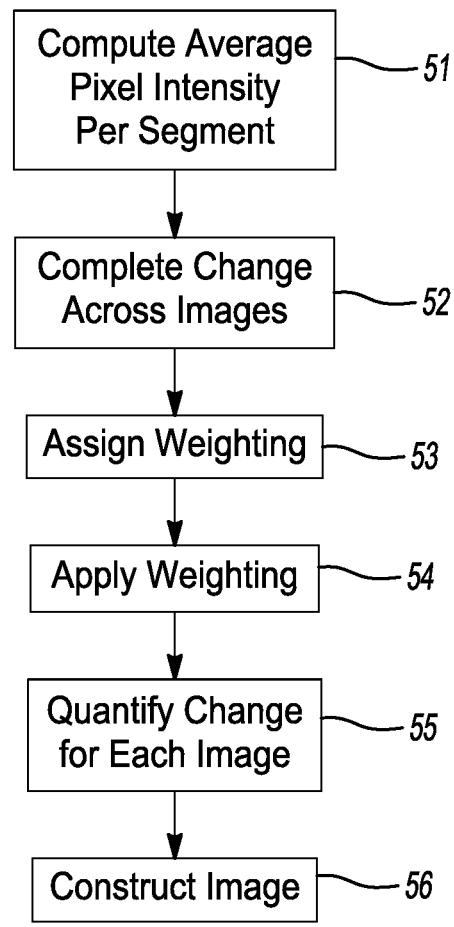
FIG. 5 is a flowchart illustrates an example embodiment for quantifying intensity changes across corresponding segments of the images in a set of images.

FIG. 5 further illustrates an example embodiment for quantifying intensity changes across corresponding segments of the images in a set of images. For this example, assume three images taken at three polarization angles with each image partitioned into 3×3 segments. For each segment in each image in the set of images, start by computing an average intensity for pixels comprising a given segment as indicated at 51. The average intensity for the segments in each image is shown below.

$$I_1 = \begin{matrix} 99 & 99 & 99 \\ 99 & 20 & 99 \\ 99 & 99 & 99 \end{matrix}, I_2 = \begin{matrix} 100 & 100 & 100 \\ 100 & 18 & 100 \\ 100 & 100 & 100 \end{matrix}, I_3 = \begin{matrix} 98 & 98 & 98 \\ 100 & 19 & 100 \\ 100 & 100 & 100 \end{matrix}$$

Next, a determination is made as to the amount of change in intensity occurring across corresponding segments of images. In this example embodiment, the amount of intensity change is determined by calculating a percentage change in the average intensity across corresponding segments. The percentage change can be represented by a ratio, where the numerator is the difference between the average intensity value from the segment with the highest value amongst corresponding segments and the average intensity value from the segment with the lowest value amongst corresponding segments. The denominator is the average intensity value from the segment with the highest value amongst corresponding segments. The percentage change can also be represented as a percentage as shown below.

$$\Delta I = \begin{matrix} 2\% & 2\% & 2\% \\ 2\% & 10\% & 2\% \\ 2\% & 2\% & 2\% \end{matrix}$$

$$R = \begin{matrix} 3 & 3 & 3 \\ 1 & 2 & 1 \\ 1 & 1 & 1 \end{matrix}$$

$$W = \begin{matrix} 0.01 & 0.01 & 0.01 \\ 0.01 & 1 & 0.01 \\ 0.01 & 0.01 & 0.01 \end{matrix}$$

$$W_f = \begin{matrix} 0 & 0 & 0 \\ 0 & 1 & 0 \\ 0 & 0 & 0 \end{matrix}$$

Matrix ΔI is a representation of the intensity change ratio for the images in this example.

In the example embodiment, a weighting factor is then assigned at 53 to each segment based on the percentage change of the intensity for that segment, thereby yielding matrix W. For illustration purposes, a percentage change greater than or equal to 10 percent is deemed to be glare or another visual impairment. In this example, segments having a percentage change less than 10 percent are assigned a weighting factor of 1 (or 0.01) while segments having a percentage change equal to or greater than 10 percent are assigned a weighting factor of 100 (or 1). In another example, segments weighting factors are assigned to be the square of the ratio of the difference between average segment intensity change and the standard intensity change, and the standard intensity change. Here, the numerator is the difference between average segment intensity change and the standard intensity change. The denominator is the standard intensity change, where the standard intensity change is defined as twice the value of the average intensity difference between the maximum intensity and minimum intensity for the entire image.

A filtering is then performed for each segment depending on the percentage change of that segment. The purpose of the filtering is to remove the contribution of segments with very little intensity change and thus no glare. In one example, for any segments that has intensity change less than this user defined level (e.g., 5% change), 0 is assigned to that segment. Conversely, for any segments having an intensity change more than the user defined level, one is assigned to the segment. Continuing with the example, the result is the filtered weighting factor matrix $W_f$ shown above. It is readily understood that the threshold value for the percentage change may be more or less than five depending on the desired sensitivity. Likewise, other values for the weighting factors are also contemplated by this disclosure.

Weighing factors are applied at 54 to the segments in each of the images to yield a result matrix WR. Specifically, the weighting matrix, W, is multiplied by a return matrix, R, where the return matrix indicates which image has the lowest intensity for each segment. In the example above, the center segment has lowest intensity across the images and thus this segment is assigned a 2 in the return matrix, where 2 is the indicia for the second image $I_2$. The upper left segment has lowest intensity in the first image and thus this segment in the return matrix is assigned a 1 in the return matrix. In this way, the return matrix indicates which image has the lowest intensity value for each segment.

Continuing with this example, the result matrix WR is as follows $$W_f R = \begin{matrix} 0 & 0 & 0 \\ 0 & 2 & 0 \\ 0 & 0 & 0 \end{matrix}$$

$$Optimal = \frac{\sum_i (W_f R)_i}{\sum_i (W_f)_i}$$

As seen, the image segments with a small amount of intensity change (~1%) are not present in the result matrix. The center segment exhibits significant intensity change and may be the subject of further analysis.

To help identify the best image in the set of images, the amount of change in each image may be quantified as indicated at 55. In the example embodiment, the final optimal image is determined by the ratio between the summation of all the elements in the matrix WfR and the element-wise summation of the weighting matrix. The ratio indicates the index for the optimal image. In this example, the ratio is 2 and thus image I2 is deemed the optimal or final image. From this example, it can be seen that, if one calculates the total intensity change without the weighing matrix, or one does not apply the filtering step to remove segments that have little glare, one would erroneously conclude that images 1 and 3 are the better images since they show larger overall intensity drop. The weighing factor, however, focuses the intensity analysis to areas of possible glare.

Figures 6, 7:
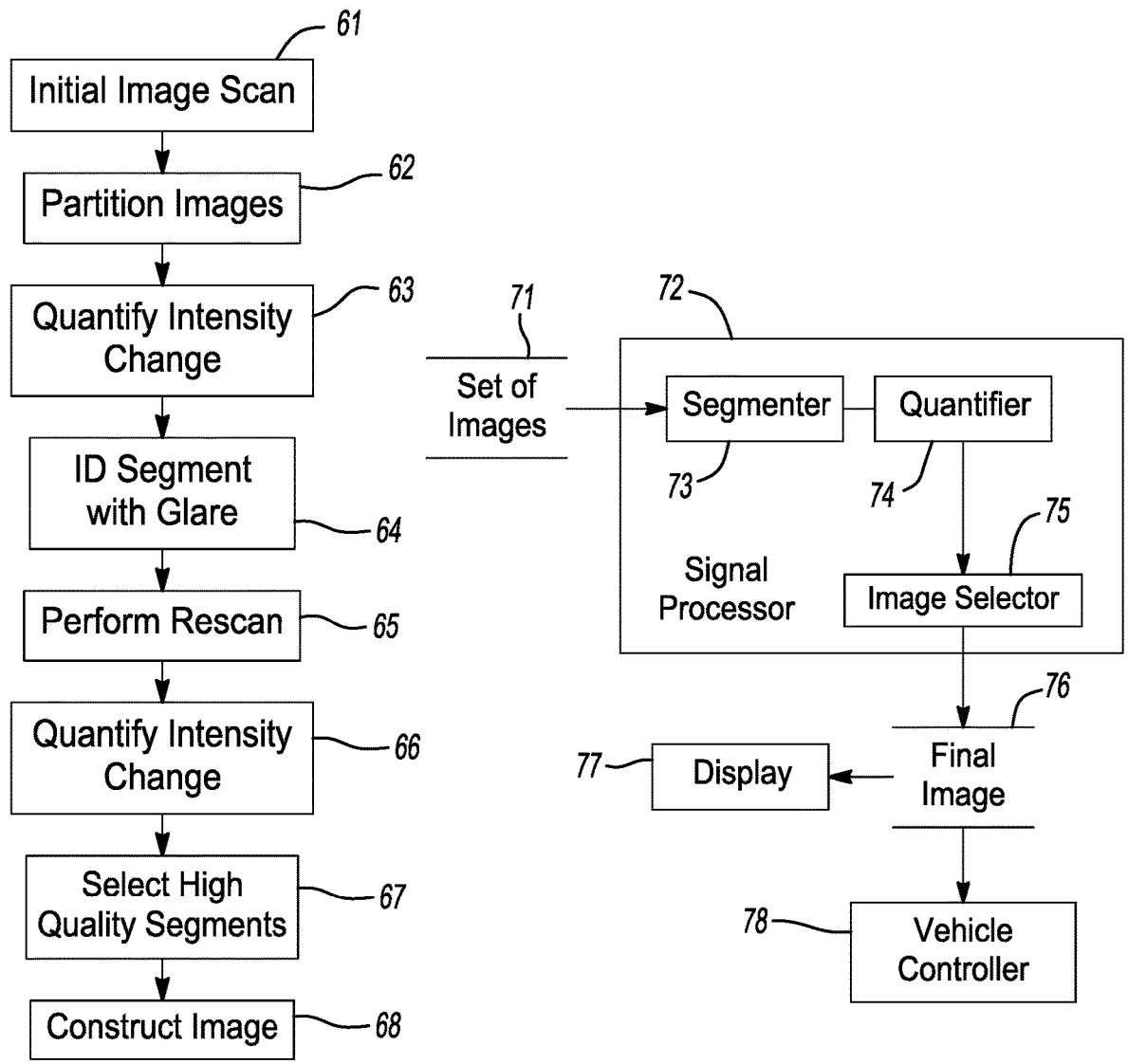
FIG. 6 is a flowchart depicting a more robust embodiment for improving visibility of images captured by the imaging system using the voltage tunable polarizer.
FIG. 7 is a diagram further depicting a portion of the imaging system.

FIG. 6 illustrates a more robust embodiment for improving visibility of images captured by the imaging system 10. The imaging system 10 performs an initial scan of a scene as indicated at 61. In this step, the multiple images of the scene are captured, with each image in the set of images captured with the voltage tunable polarizer set at a different polarization angle. In a simple example, the images are captured with the voltage tunable polarizer set at 0, 30, 60 and 90 degrees.

Each image in the set of images is partitioned at 62 and the intensity change is quantified for each image in the set of images at 63. These two steps may be implemented in the manner described above.

To improve accuracy, another iteration of analyzing the scene may be undertaken by the imaging system. To do so, the scene is re-imaged at 65. In the simple example, a particular image having the least amount of intensity change amongst the set of images is identified from the initial scan. One can identify the polarization angle at which the particular image was captured, for example at 30 degrees. In the second iteration, additional images of the scene are captured by the imaging system, where the additional images are captured at polarization angles centered around the polarization angle associate with the particular image (i.e., 30 degrees). Separation between the polarization angles at which the additional images is captured is less than the separation at which the first set of mages were captured at. In this simple example, the additional images can be captured at one degree increments on either side of 30 degrees. For example, the additional images can be captured at 25, 26, 27, 28, 29, 31, 32, 33, 34, and 35 degrees. It is readily understood that these increments are merely illustrative.

In a more robust example, segments may be selected from different images in the set of images and stitched together to form a final image. Given the quantified intensity change for each segment, particular segments which exhibit glare or some other impairment can be identified at 64 from the initial scan. Again, the identified segments may be those segments having a change ratio greater than ten percent. It is envisioned that glare may appear in more than one area of the image such that two or more segments may be identified as exhibiting glare.

For each segment that exhibits glare, a particular image is identified from the set of images captured during the initial scan. Continuing with the example above, the center segment is identified as exhibiting glare. Looking across the set of images, the center segment with the lowest average intensity for the pixels comprising the segment is the second image I2. This second image is presumed to have the least amount of glare in the area of the center segment. Consequently, further analysis will be centered around the polarization angle at which the second image was captured. Assuming the second image was captured at polarization angle of 30 degrees, the additional images are captured at polarization angles centered around the polarization angle of 30 degrees. By way of contrast, if the second image was captured at a polarization angle of 60 degrees, the additional images are captured at polarization angles centered around the polarization angle of 60 degrees.

In some cases, two or more different segments may exhibit glare. For example, the segment in the upper right corner and the segment in the lower left corner may exhibit glare. In this case, image with the lowest average intensity for the respective segments may differ. The segment in the upper right corner may have the lowest average intensity for the image captured at polarization angle set at 30 degrees; whereas, the segment in the lower left corner may have the lowest average intensity for the image captured at polarization angle set at 90 degrees. In this case, a second scan captures additional images centered around both 30 degrees and 90 degrees. These particular polarization angles are merely intended to be illustrative.

Upon completing the rescan of the scene, each of the additional images is partitioned and, for each additional image, the intensity change is quantified as indicated at 66. Again, these two steps may be implemented in the manner described above.

An image having the best visibility is identified and/or constructed as indicated at 68. In the simple example, the image having the least amount of intensity change amongst the additional images is identified and used as the final image.

In the more robust example, segments may be selected at 67 from different images in the set of images and stitched together to form a final image in step 68. Continuing with the example above where the segment in the upper right corner and the segment in the lower left corner exhibit glare, the additional images are evaluated with a different filtering setting (such as a lower intensity change ratio threshold) to select the particular segment to be included in the final image. Specifically, for the segment in the upper right corner, the additional images captured at polarization angles centered around 30 degrees are evaluated. The particular segment from these additional images having the lowest amount of intensity change is selected for inclusion in the final image. Likewise, for the segment in the lower left corner, the additional images captured at polarization angles centered around 90 degrees are evaluated. The particular segment from these additional images having the lowest amount of intensity change is selected for inclusion in the final image. By way of example, the segment for the upper right corner may be taken from the image captured at 28 degrees and the segment for the lower left corner may be taken from the image captured at 91 degrees. The remaining segments for the final image are taken from the initial set of images. In this way, the main objective for a second round of scanning is to decrease the overall time consumption and to increase accuracy by capturing and processing less images and smaller scan range.

FIG. 7 further depicts the signal processor of the imaging system 10. The signal processor 72 is comprised generally of a segmentor 73, a quantifier 74 and an image selector 75. The segmentor 73 is configured to receive a set of images 71 from the imager and partition each image in the set of images into a plurality of image segments. Each image in the set of images is captured with the voltage tunable polarizer set at a different polarization angle as described above.

The quantifier in turn operates to determine an amount of change in intensity across corresponding segments of images in the set of images and quantifies the amount of intensity change for each image in the set of images from the amount of change in intensity in segments comprising the image. Lastly, the image selector 75 operates to identify a given image from the set of images based on the quantified amount of intensity change, where the given image has least amount of intensity change amongst the set of images. This identified image is also referred to herein as the final image 76.

While reference has been made to polarization modulation throughout this disclosure, it is also envision that images can be captured across a retardance range (e.g., 0-1000 nm). This type of phase-to-intensity modulation allows for fast response time and high spatial resolution.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for reducing glare in images captured by an imaging system, comprising:

capturing, by an imaging system, multiple images of a scene to form a set of images, where the imaging system includes a voltage tunable polarizer and each image in the set of images is captured with the voltage tunable polarizer set at a different polarization angle;

partitioning, by a signal processor of the imaging system, each image in the set of images into a plurality of segments;

for corresponding segments in the set of images, determining, by the signal processor, an amount of change in intensity across corresponding segments of images in the set of images;

quantifying, by the signal processor, the amount of intensity change for each image in the set of images;

identifying, by the signal processor, a given image from the set of images based on the quantified amount of intensity change, where the given image has least amount of intensity change amongst the set of images.

2. The method of claim 1 further comprises partitioning each image in the set of images such that each segment includes data from three or more pixels of an imager of the imaging system.

3. The method of claim 1 further comprises, for each segment in each image in the set of images, computing an average intensity for pixels comprising a given segment, and determining an amount of change in intensity across corresponding segments of images by calculating a percentage change in the average intensity across corresponding segments.

4. The method of claim 3 wherein quantifying the amount of intensity change for each image further comprises assigning a weighting factor to each segment in the plurality of segments based on the amount of change in intensity across corresponding segments of images, constructing a return matrix, multiplying the weighting factor for each segment by the return matrix to yield a result matrix, and determining the given image from the result matrix, where values of the return matrix indicate image with lowest intensity value for the corresponding segment in the set of images.

5. The method of claim 1 further comprises displaying the given image on a display device.

6. The method of claim 1 further comprises inputting the given image into a control system for an autonomous vehicle and controlling the autonomous vehicle in part based on the given image.

7. The method of claim 4 further comprises
identifying a particular segment from the plurality of segments which exhibits glare;
identifying a particular image from the set of images, where the particular image includes the particular segment with lowest average intensity for pixels comprising the particular segment;
determining a polarization angle at which the particular image was captured;
capturing additional images of a scene with the imaging system, where the additional images are captured at polarization angles centered around the polarization angle at which the particular image was captured and separation between the polarization angles is less than the separation at which the multiple images were captured.

8. The method of claim 7 further comprises
partitioning each image in the additional images into the plurality of segments;
for the particular segment in each additional image, determining an amount of change in intensity across pixels comprising the particular segment; and
selecting the particular segment from the additional images, where the selected particular segment has lowest amount of change in intensity across pixels comprising the selected particular segment; and
constructing a final image in part using the selected particular segment.

9. The method of claim 1 wherein the voltage tunable polarizer includes: a first quarter waveplate configured to receive the light from a scene; a first liquid crystal retarder positioned adjacent to the first quarter waveplate and configured to receive the light passing through the first quarter waveplate; a linear polarizer having an incoming surface positioned adjacent to the first liquid crystal retarder and configured to receive the light passing through the first liquid crystal retarder; a second liquid crystal retarder positioned adjacent to an outgoing surface of the linear polarizer and configured to receive the light passing through the linear polarizer; and a second quarter waveplate positioned adjacent to the second liquid crystal retarder and configured to receive the light passing through the second liquid crystal retarder, where the incoming surface of the linear polarizer opposes the outgoing surface of the linear polarizer.

10. A method for reducing glare in images captured by an imaging system, comprising:
capturing, by an imaging system, multiple images of a scene to form a set of images, where the imaging system includes a voltage tunable polarizer and each image in the set of images is captured with the voltage tunable polarizer set at a different polarization angle;
partitioning, by a signal processor of the imaging system, each image in the set of images into a plurality of segments;
for corresponding segments in the set of images, determining, by the signal processor, an amount of change in intensity across corresponding segments of images in the set of images;
identifying a particular segment from the plurality of segments which exhibits glare;
identifying a particular image from the set of images, where the particular image includes the particular segment with lowest average intensity for pixels comprising the particular segment;
determining a polarization angle at which the particular image was captured;
capturing additional images of a scene with the imaging system, where the additional images are captured at polarization angles centered around the polarization angle at which the particular image was captured and separation between the polarization angles is less than the separation at which the multiple images were captured.

11. The method of claim 10 further comprises partitioning each image in the set of images such that each segment includes data from three or more pixels of an imager of the imaging system.

12. The method of claim 10 further comprises, for each segment in each image in the set of images, computing an average intensity for pixels comprising a given segment, and determining an amount of change in intensity across corresponding segments of images by calculating a percentage change in the average intensity across corresponding segments.

13. The method of claim 10 further comprises
partitioning each image in the additional images into the plurality of segments;
for the particular segment in each additional image, determining an amount of change in intensity across pixels comprising the particular segment; and
selecting the particular segment from the additional images, where the selected particular segment has lowest amount of change in intensity across pixels comprising the selected particular segment; and
constructing a final image in part using the selected particular segment.

14. The method of claim 13 wherein constructing a final image further comprises:
quantifying, by the signal processor, the amount of intensity change for each image in the set of images;
identifying, by the signal processor, a given image from the set of images based on the quantified amount of intensity change, where the given image has least amount of intensity change amongst the set of images;

replacing segment corresponding to the selected particular segment in the given image with the selected particular segment to form the final image.

15. An imaging system, comprising:

an imager that captures images of a scene;

a voltage-tunable polarizer disposed in light path of the imager, where, in response to a voltage applied thereto, the voltage-tunable polarizer changes polarization state of light propagating therethrough without mechanical rotation of the polarizer itself; and a controller is in data communication with the imager and the voltage-tunable polarizer and operates to supply voltage to the voltage-tunable polarizer; wherein the controller includes a segmentor configured to receive a set of images from the imager and partition each image in the set of images into a plurality of image segments, where each image in the set of images is captured with the voltage tunable polarizer set at a different polarization angle;

a quantifier operates to determine an amount of change in intensity across corresponding segments of images in the set of images and quantify the amount of intensity change for each image in the set of images from the amount of change in intensity in segments comprising the image; and an image selector operates to identify a given image from the set of images based on the quantified amount of intensity change, where the given image has least amount of intensity change amongst the set of images.

* * * * *

UNITED STATES PATENT AND TRADEMARK OFFICE
CERTIFICATE OF CORRECTION

| | | |
|---|---|---|
| PATENT NO. | : 11,388,350 B2 | Page 1 of 1 |
| APPLICATION NO. | : 17/133600 | |
| DATED | : July 12, 2022 | |
| INVENTOR(S) | : Somin Eunice Lee et al. | |

It is certified that error appears in the above-identified patent and that said Letters Patent is hereby corrected as shown below:

In the Claims

At Column 11, Claim number 7, Line number 32, after "comprises", insert --:--.

At Column 11, Claim number 8, Line number 48, after "comprises", insert --:--.

At Column 11, Claim number 9, Line number 61, after "includes:", insert --¶--.

At Column 11, Claim number 9, Line number 62, after "scene;", insert --¶--.

At Column 11, Claim number 9, Line number 65, after "waveplate;", insert --¶--.

At Column 12, Claim number 9, Line number 1, after "retarder;", insert --¶--.

At Column 12, Claim number 9, Line number 4, after "and", insert --¶--.

At Column 12, Claim number 13, Line number 50, after "comprises", insert --:--.

At Column 13, Claim number 15, Line number 15, after "polarizer;", insert --¶--.

At Column 13, Claim number 15, Line number 16, after "includes", insert --:--.

Signed and Sealed this
Sixth Day of September, 2022

*Katherine Kelly Vidal*
Katherine Kelly Vidal
*Director of the United States Patent and Trademark Office*